(12) United States Patent
DeRosa et al.

(10) Patent No.: US 11,680,862 B2
(45) Date of Patent: Jun. 20, 2023

(54) TRUE GAUGE PRESSURE TRANSDUCER WITH ANTI-ICING FEATURES OF PRESSURE PORTS

(71) Applicant: KULITE SEMICONDUCTOR PRODUCTS, INC., Leonia, NJ (US)

(72) Inventors: Louis DeRosa, Saddle River, NJ (US); Robert Gardner, Westwood, NJ (US)

(73) Assignee: KULITE SEMICONDUCTOR PRODUCTS, INC., Leonia, NJ (US)

( * ) Notice: Subject to any disclaimer, the term of this patent is extended or adjusted under 35 U.S.C. 154(b) by 0 days.

(21) Appl. No.: 17/523,991

(22) Filed: Nov. 11, 2021

(65) Prior Publication Data

US 2023/0048531 A1 Feb. 16, 2023

Related U.S. Application Data

(60) Provisional application No. 63/232,074, filed on Aug. 11, 2021.

(51) Int. Cl.
*G01L 19/00* (2006.01)
*G01L 13/00* (2006.01)

(52) U.S. Cl.
CPC .......... *G01L 19/0007* (2013.01); *G01L 13/00* (2013.01)

(58) Field of Classification Search
None
See application file for complete search history.

(56) References Cited

U.S. PATENT DOCUMENTS

| | | | |
|---|---|---|---|
| 2004/0187588 A1* | 9/2004 | Miyazawa | G01L 15/00 73/716 |
| 2004/0255682 A1* | 12/2004 | Petrova | G01L 9/0055 73/715 |
| 2006/0091074 A1* | 5/2006 | Pedersen | C02F 1/444 210/744 |
| 2009/0288493 A1* | 11/2009 | Larson | G01L 19/0645 73/756 |

* cited by examiner

*Primary Examiner* — Brandi N Hopkins
*Assistant Examiner* — Nigel H Plumb
(74) *Attorney, Agent, or Firm* — Troutman Pepper Hamilton Sanders LLP; James E. Schutz; Mark Lehi Jones

(57) ABSTRACT

A gauge pressure transducer assembly having anti-icing features to allow for easy drainage of fluids to prevent pooling and icing. The assembly can include a header having one or more atmospheric ports extending therethrough, a differential sensing element mounted to the header, a header cap attached to at least a portion of the header, a gauge adapter attached to the header and in communication with the one or more atmospheric ports of the header, an elongated tube attached to the header cap, and a front port attached to the elongated tube. The gauge adapter includes a plurality of through-holes to facilitate drainage and de-icing, which is an improvement over conventional transducers that can trap water within the ports that can freeze and cause damage. The header and the gauge adapter of the gauge pressure transducer assembly can reduce or eliminate regions where water can pool and freeze.

20 Claims, 4 Drawing Sheets

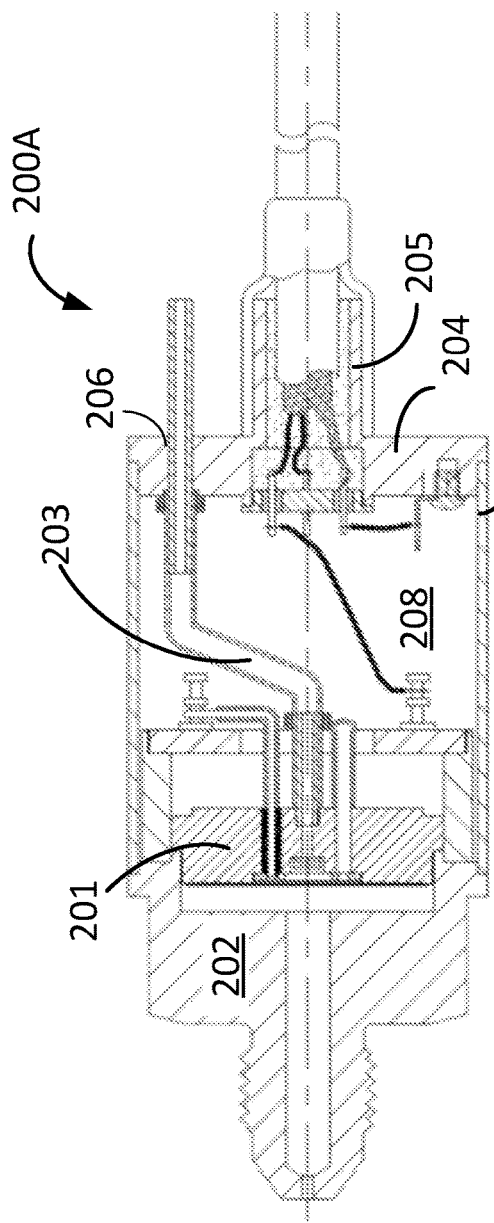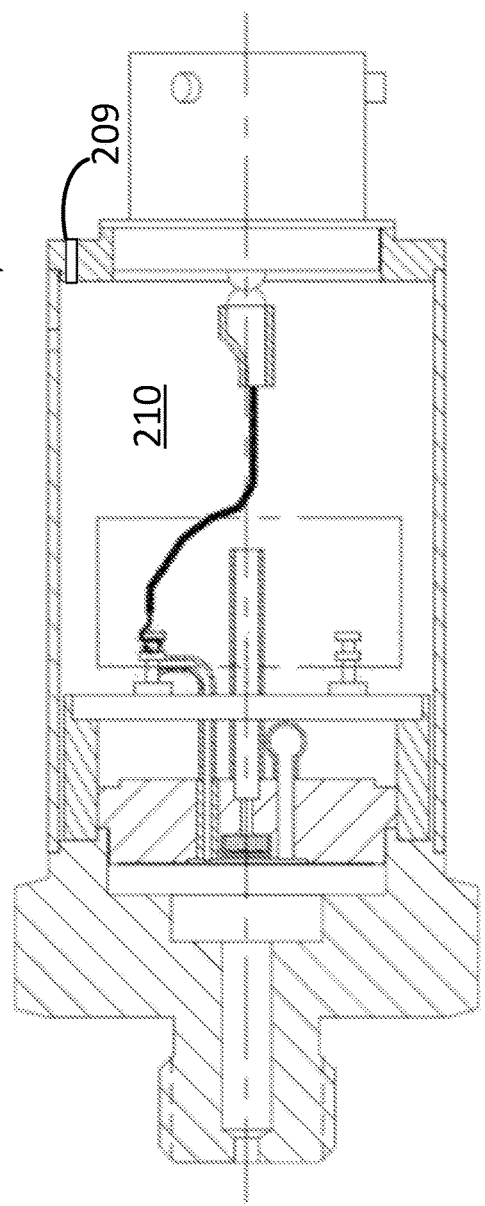
FIG. 2A
FIG. 2B

TRUE GAUGE PRESSURE TRANSDUCER WITH ANTI-ICING FEATURES OF PRESSURE PORTS

CROSS-REFERENCE TO RELATED APPLICATIONS

This application claims the benefit of U.S. Provisional Application Ser. No. 63/232,074, filed on 11 Aug. 2021, which is incorporated herein by reference in its entirety.

FIELD

The disclosed technology concerns pressure transducers, and in particular, embodiments disclosed herein relate to true gauge pressure transducers having anti-icing features to allow for easy drainage of fluids to prevent pooling and icing.

BACKGROUND

The measurement of gauge pressure (measurement pressure referenced to atmospheric pressure) is often utilized in applications under extreme environmental conditions, such as on an aircraft in flight. One of the challenges faced in such applications is that, due to cold temperatures and high moisture conditions, there can be a high likelihood of icing of any pressure ports left open to the atmosphere.

Previous approaches for obtaining gauge pressure have involved using two absolute pressure sensors: one to measure the atmospheric pressure, and another for the measurement pressure. In such approaches, the gauge pressure is calculated as a difference between the outputs of the two sensors. This two-sensor approach to measuring gauge pressure can work well in certain applications, but other approaches are necessary for applications that have tight size constraints and/or high accuracy requirements.

To address gauge pressure applications that have size and/or accuracy constraints, differential pressure transducers have been employed, where the main pressure is routed through an inlet port to a front-side of a differential transducer, and atmospheric pressure is directed to the back-side of the differential transducer via a small tube or opening in the back-side of the enclosure. Unfortunately, these previous approaches have not addressed the problems associated with water entering the transducer enclosure and causing destructive failure upon freezing. Accordingly, there is a need for a small-form gauge pressure transducer that can avoid icing.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF SUMMARY

Embodiments disclosed herein relate to pressure transducers having anti-icing features to allow for easy drainage of fluids to prevent pooling and icing.

A gauge pressure transducer assembly is disclosed that can include a header having one or more atmospheric ports extending therethrough, a first differential sensing element mounted to the header, a gauge adapter attached to the header and in communication with the one or more atmospheric ports of the header, the gauge adapter comprising a plurality of through-holes to facilitate drainage and de-icing, a front attachment port having a bore extending therethrough, and an elongated tube having a front end and a back end, wherein the elongated tube is disposed in the bore of the front attachment and the back end of the elongated tube is in communication with at least the first differential sensing element. In some implementations, the header and the gauge adapter are disposed at the backside of the gauge pressure transducer assembly to reduce or eliminate regions where water can pool and freeze.

The disclosed technology includes a method for assembling a gauge pressure transducer. The method can include preparing a header subassembly, which includes mounting a pressure sensor chip to a header, attaching a gauge adaptor the header, the gauge adapter comprising a plurality of through-holes to facilitate drainage and de-icing, attaching an elongated tube to a header cap, and attaching the header cap to a front side of the header. The method can include preparing a front port assembly, which can include attaching electronic circuitry to a front attachment port, attaching a sleeve to a portion of the front attachment port, electrically connecting at least one conductor of the electronic circuitry to an electronic signal connector port, and attaching the header subassembly to the front port assembly.

BRIEF DESCRIPTION OF THE FIGURES

FIG. 2A illustrates a cross-sectional side view of a differential pressure sensor assembly where atmospheric pressure is routed to one side of the sensing element via a small tube.

FIG. 2B illustrates a cross-sectional side view of a differential pressure sensor assembly where atmospheric pressure can communicate with one side of the sensing element via one or more holes in the housing or enclosure.

DETAILED DESCRIPTION

Figure 1:
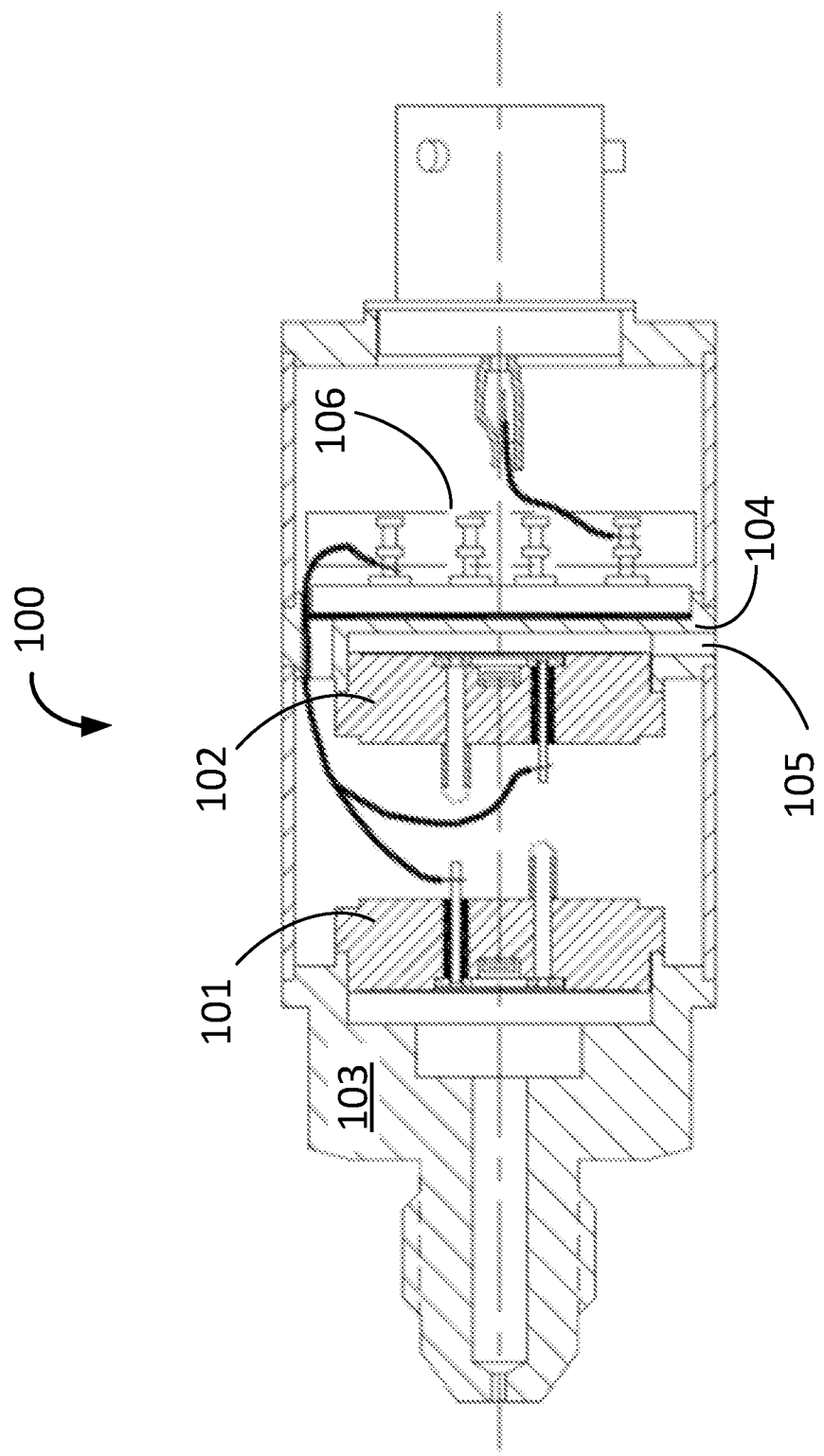
FIG. 1 illustrates a cross-sectional side view of pressure transducer assembly having two separate absolute pressure sensor chips.

Exemplary embodiments of the disclosed technology provide for a compact, gauge pressure transducer with anti-icing drain holes that can prevent entrapment of water in the enclosure and avoid failures due to freezing.

Although preferred embodiments of the disclosed technology are explained in detail, it is to be understood that other embodiments are contemplated. Accordingly, it is not intended that the disclosed technology is limited in its scope to the details of construction and arrangement of components outlined in the following description or illustrated in the drawings. The disclosed technology is capable of other embodiments and of being practiced or carried out in various ways. Also, in describing the preferred embodiments, specific terminology will be resorted to for the sake of clarity.

Referring now to the drawings, in which like numerals represent like elements, exemplary embodiments of the disclosed technology are herein described. It is to be understood that the figures and descriptions of the disclosed technology have been simplified to illustrate elements that are relevant for a clear understanding of the disclosed technology, while eliminating, for purposes of clarity, many other elements found in typical pressure transducer assemblies and methods of making and using the same. Those of ordinary skill in the art will recognize that other elements are desirable and/or required to implement the disclosed technology. However, because such elements are well known in the art, and because they do not facilitate a better understanding of the disclosed technology, a discussion of such elements is not provided herein.

FIG. 1 illustrates a cross-sectional side view of a pressure transducer assembly 100 having two separate absolute pressure sensor chips. In this embodiment, a first absolute pressure header 101 houses a first absolute pressure sensor chip, and a (separate) second absolute pressure header 102 houses a second absolute pressure sensor chip. The first absolute pressure header 101 may be attached to a front port 103 so that it can measure a first (unknown) pressure. The second absolute pressure header 102 may be attached to an adaptor 104 having a hole 105 through a side of the transducer assembly 100 to allow atmospheric pressure to reach the second absolute pressure sensor that is attached to the second absolute pressure header 102. The corresponding electrical signals from the two absolute pressure sensors may be routed to a circuit board 106 where a difference between the signals can be processed by electronics (for example, one signal may be electrically subtracted from the other) and the resulting signal (proportional to the gauge pressure) may be output from the transducer assembly 100.

This two-sensor approach to measuring a gauge pressure can perform well when there is not a size constraint and/or where accuracy requirements are not overly tight. However, when two separate sensors are used (with corresponding separate headers), the resulting assembly can be large, and it can also be difficult and time-consuming to properly match and/or compensate both sensors over the full pressure and temperature range to allow for tight accuracy over a wide temperature range. Thus, in certain applications having size and/or accuracy constraints, it can be advantageous to utilize a single true gauge pressure transducer that measures the differential pressures.

FIG. 2A illustrates a cross-sectional side view of a differential pressure sensor assembly 200A where atmospheric pressure is routed to the back side of the sensing element via a small tube 203. In this embodiment, a single pressure header 201 may house a differential sensor chip. A first pressure may enter through a bore in the main pressure port 202 and may be in communication with one side of the differential sensor chip for measurement of a main pressure. A small diameter reference tube 203 may be attached to the backside of the header 201. The tube 203 may be routed to the outside of the assembly 200A so that atmospheric pressure may be transmitted to the other side of the differential sensor chip. The gauge pressure may be output as the difference between the first pressure and the atmospheric pressure. In this example embodiment, a plate 204 may accept and support a cable strain relief 205 and/or may provide a support 206 for the reference tube 203. A sleeve 207 may be installed to join the plate 204 and the main pressure port 202 to form a cavity 208 within the assembly 200A, which may house electronic circuitry. One drawback of this design is that moisture may enter the cavity 208 via any leaks around the assembly 200A. Upon encountering freezing conditions, any water in the cavity 208 can freeze and damage the assembly.

FIG. 2B illustrates a cross-sectional side view of another differential pressure sensor assembly 200B similar to the one shown in FIG. 2A but configured so that atmospheric pressure can enter through a hole 209 in the rear portion of the enclosure and to a cavity 210 where the atmospheric pressure can communicate with the sensing element.

In certain applications where moisture and/or freezing is not a concern, the assemblies 200A and/or 200B shown in FIG. 2A and FIG. 2B may work well. However, for applications where moisture and/or freezing is a factor, there is a possibility that the cavities 208 210 could (fully or partially) fill with water and cause destructive failure upon freezing. Even if multiple drain holes are put into the case, it is likely that water can still collect within the cavities 208, 210 in some orientations. In some instances, water entering the reference tube 203 may be difficult to drain in certain orientations. Upon freezing, the water in the tube 203 can either clog or damage the transducer. Certain implementations may address this issue by utilizing a filter of fine mesh to cover the vent hole to prevent water from entering. This approach can work for a limited time, but with changes in pressure, temperature, and humidity, the water can eventually enter the transducer and may lead to premature failure.

Figure 3:
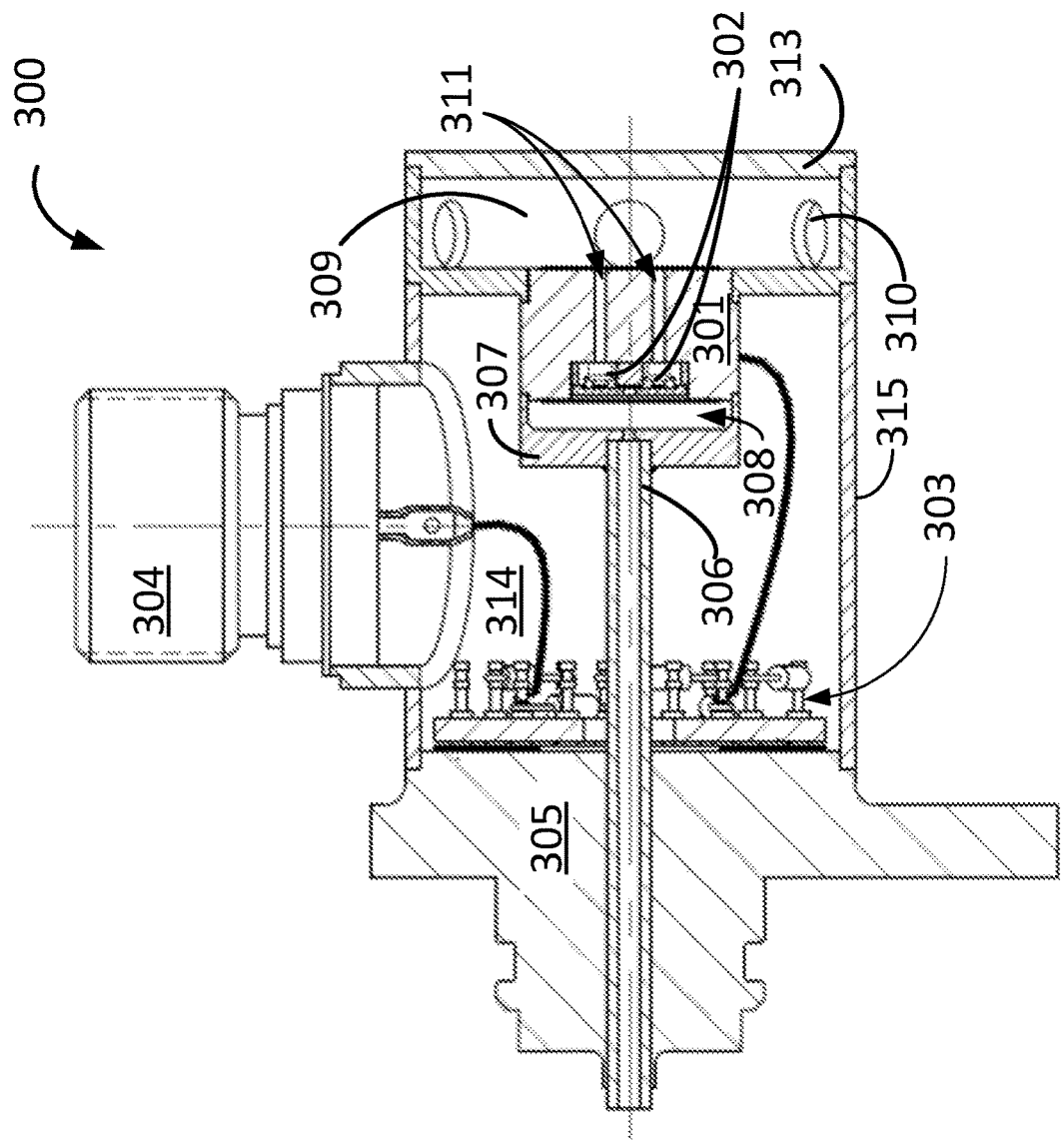
FIG. 3 illustrates a cross-sectional side view of a gauge pressure sensor assembly, in accordance with certain exemplary implementations of the disclosed technology, where the sensing element is disposed towards the backside of the assembly body and in communication with a gauge adapter having many holes around its periphery such that atmospheric pressure can communicate with the backside of the sensing element while facilitating drainage of any water.

FIG. 3 illustrates a cross-sectional side view of a gauge pressure sensor assembly 300 having certain preferred features in accordance with exemplary implementations of the disclosed technology. In this example implementation, a header 301 housing a differential pressure sensing chip 302 may be disposed towards the rear side of the assembly 300. In certain implementations, electronic circuitry 303 may be disposed towards the front side of the assembly 300 in contrast to the arrangement shown in FIGS. 1, 2A, and 2B, in which circuit boards are disposed towards the rear side of the corresponding assemblies 100, 200A, and 200B. In certain implementations, an electronic signal connector port 304 may be attached to the assembly 300. FIG. 3 depicts the electronic signal connector port 304 disposed towards the middle of the assembly 300 in contrast to the arrangement shown in FIGS. 1, 2A, and 2B, in which signal ports are disposed on the rear side of the corresponding assemblies 100, 200A, and 200B.

In accordance with certain exemplary implementations of the disclosed technology, the front attachment port 305 may allow a first (main) pressure to be in communication with one side of one or more differential pressure sensing chip(s) 302 via an elongated tube 306. In certain implementations, the elongated tube 306 may connect to a header cap 307, which may be secured to the header 301. In certain implementations, the header cap 307 may define a cavity 308 in communication with the front side of the differential pressure sensing chip(s) 302. According to an exemplary implementation, the header cap 307 may include a recess configured to accept the back end of the elongated tube 306. The header cap 307 may include a through-hole in axial alignment with the recess to communicate a pressure present at the front end opening of the elongated tube 306 to one or more of the differential sensing chip(s) 302.

In accordance with certain exemplary implementations of the disclosed technology, the pressure sensor assembly 300 may include a gauge adapter 309 having a plurality of holes 310 around its periphery such that atmospheric pressure can communicate with the other side of the differential pressure sensing chip(s) 312 via one or more atmospheric port(s) 311 in the header 301 while facilitating drainage of any water. In certain implementations, a cap 313 may be installed on the gauge adapter 309.

In certain exemplary implementations of the disclosed technology, the header 301 may be an oil-filled header. Depending on the application, and in embodiments that utilize an oil-filled header, the oil may fill a front portion, a back portion, both the front and the back portions (or neither) of corresponding cavities surrounding the differential pressure sensing chip 302.

In certain exemplary implementations, the header 301 may include header pins through the side of the header 301 to facilitate electrical connection between the differential pressure sensing chip 302 and the electronic circuitry 303. In certain exemplary implementations, and depending on the application, the header pins may extend through the back side of the header 301.

In certain exemplary implementations, the header 301 may be configured (as shown) to support redundant (or dual channel) differential pressure sensing chips 312, each with its own backside atmospheric port 311. In other exemplary embodiments (not shown), the header 301 may be configured for use with a single pressure sensing chip.

In accordance with certain exemplary implementations of the disclosed technology, the gauge adaptor 309 (attached to header 301 and terminated with the cap 313) may allow for the ambient atmospheric pressure to be directed to the pressure sensing chip 302. The gauge adaptor 309 may be configured to have many through-holes 310 around the periphery to allow for easy drainage in any orientation. In certain implementations, the arrangement of the header 301 and the gauge adapter 309 may eliminate (or reduce) any cavity between the gauge adaptor 309 and the header 301, thus eliminating (or reducing) regions for which water may gather and/or pool.

According to an exemplary implementation, disposing the header towards the rear of the assembly 300 may facilitate a reduced-sized cavity that is open to the atmosphere, thus reducing the likelihood of water pooling, freezing, and/or contacting the electronic circuitry 303, which may be enclosed in a cavity 314 that may be sealed from the atmosphere. In accordance with certain exemplary implementations of the disclosed technology, the cap 313 may also include through-holes, depending on how the transducer is to be mounted.

According to an exemplary implementation of the disclosed technology, the pressure sensor assembly 300 may be assembled by mounting the pressure sensor chip 302 to the header 301, then attaching the gauge adaptor 309 to the header 301. In certain implementations, the elongated tube 306 may be attached to the header cap 307, and the header cap 307 may be attached to the header 301. The resulting header subassembly (with the attached pressure sensor chip 302, gauge adapter 309, header cap 307, and elongated tube 306) may then be attached to the front port assembly, which may include the front attachment port 305, a sleeve 315, the electronic circuitry 303, and the electronic signal connector port 304. The elongated tube 306 may then be attached and welded to the front portion of the front attachment port 305. In certain exemplary implementations, the gauge adaptor 309 may be welded to the sleeve 315. In accordance with certain exemplary implementations of the disclosed technology, the assembly and attachment of the various components can be done by one or more of: welding, brazing, epoxying, or glassing depending on the application.

The disclosed technology (particularly the embodiment of FIG. 3) provides several technical improvements and is advantageous over conventional pressure transducer assemblies. The sensor assembly 300, for example, is less likely to trap water and freeze. Furthermore, the sensor assembly 300 can facilitate the utilization of a single header 301 and a corresponding reduction in the number of required pressure sensing chips. Since the header and pressure-sensing chip of a pressure transducer often comprises a large portion of the cost (especially for redundant transducers), such reductions can be a large cost saving. The sensor assembly 300 may further allow for a more compact design since there is only one header to fit. The sensor assembly 300 may further enable easier and more accurate thermal compensation. For example, the assembly 100 depicted in FIG. 1 includes two sensors (one for main pressure, and one for ambient pressure) each mounted to different headers 101 102, which can require separate thermal compensation. In contrast, the sensor assembly 300 depicted in FIG. 3 has one or more differential sensor chips 302 mounted on the same header 301, which can eliminate the need to separately compensate for thermal mismatches between the sensor chips 302.

Figure 4:
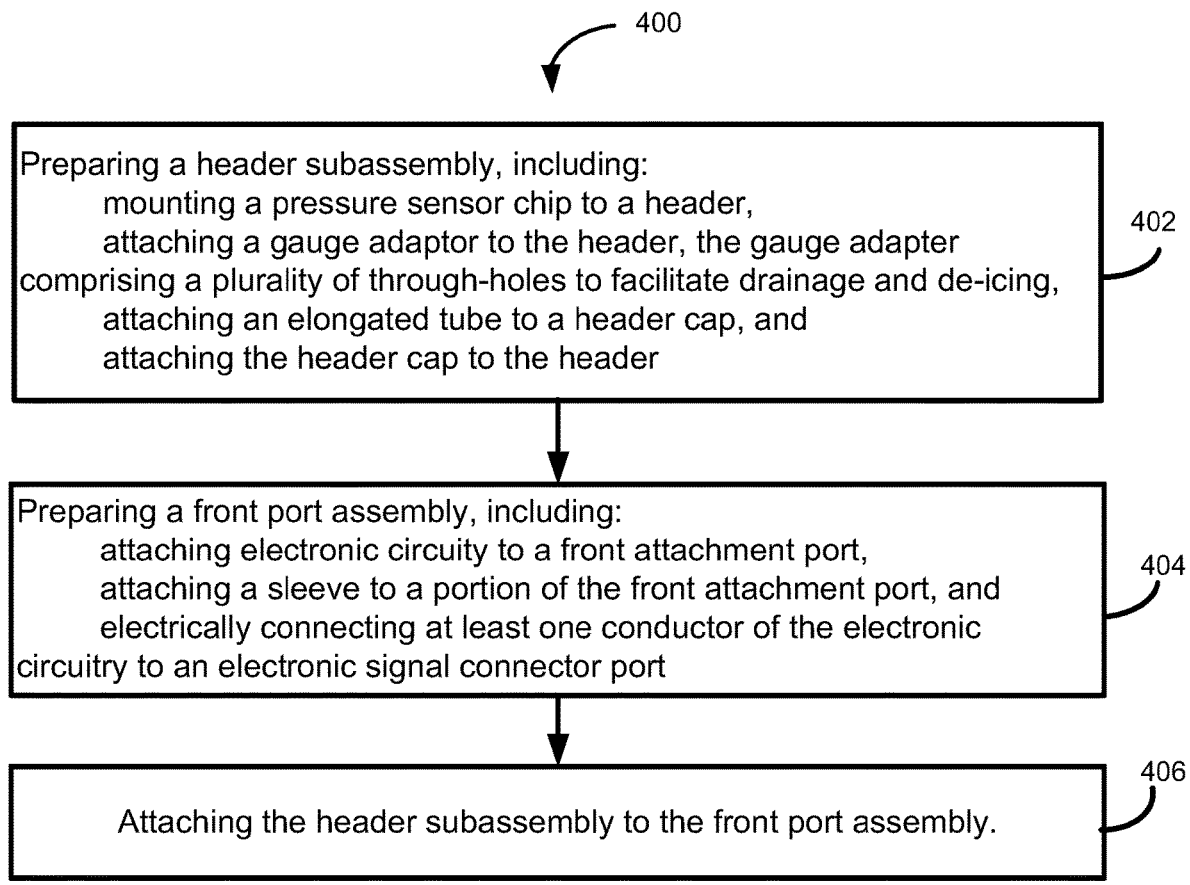
FIG. 4 is a flow diagram of a method 400, in accordance with exemplary embodiments of the disclosed technology.

FIG. 4 is a flow diagram of a method 400, in accordance with exemplary embodiments of the disclosed technology. In block 402, the method 400 includes preparing a header subassembly, which includes mounting a pressure sensor chip to a header, attaching a gauge adaptor to the header, the gauge adapter comprising a plurality of through-holes to facilitate drainage and de-icing, attaching an elongated tube to a header cap; and attaching the header cap to the header. In block 404, the method 400 includes preparing a front port assembly, which includes attaching electronic circuitry to the front attachment port, attaching a sleeve to a portion of the front attachment port, and electrically connecting at least one conductor of the electronic circuitry to an electronic signal connector port. In block 406, the method 400 includes attaching the header subassembly to the front port assembly.

Certain exemplary implementations of the disclosed technology can include electrically connecting at least one conductor of the electronic signal connector port to the electronic circuitry.

In certain exemplary implementations, attaching the header subassembly to the front port assembly can include sliding the elongated tube portion of the header subassembly into a through-hole of the front attachment port.

Certain exemplary implementations of the disclosed technology can include welding at least a portion of a front end of the elongated tube to the front attachment port to seal an end of the through-hole to a sidewall of the elongated tube.

Certain exemplary implementations of the disclosed technology can include welding the gauge adapter to the sleeve.

Certain exemplary implementations of the disclosed technology can include welding a back end of the elongated tube to the header cap.

Certain exemplary implementations of the disclosed technology can include welding the header cap to at least a portion of the header.

Certain exemplary implementations of the disclosed technology can include sealing the electronic circuitry a cavity defined by the front port assembly and the header subassembly.

In certain exemplary implementations, the header and the gauge adapter may be disposed towards a backside of the gauge pressure transducer assembly.

In certain exemplary implementations, the atmospheric port(s) may extend through the header from a first side of the header to a second side of the header. In certain exemplary implementations, the first differential sensing element may be mounted to the first side of the header. In certain implementations, the first side of the header corresponds to a front portion of the header. In certain implementations, the first side of the header corresponds to a side portion of the header.

In accordance with certain exemplary implementations of the disclosed technology, the atmospheric port(s) may extend through the header from a first side of the header to a second side of the header. In some implementations, the gauge adapter may beattached to the second side of the header. In certain implementations, the second side of the header corresponds to a back portion of the header. In certain implementations, the second side of the header corresponds to a side portion of the header.

In accordance with certain exemplary implementations of the disclosed technology, the header cap may be characterized by a front side and a back side. The front side of the header cap may be attached to the back end of the elongated tube and the back side of the header cap may be attached to at least a portion of the header. The header cap is configured to communicate a pressure at the front end of the elongated tube to one ore more differential sensing elements. In certain implementations, the header cap includes a recess configured to accept the back end of the elongated tube. In certain implementations, the header cap can include a through-hole in axial alignment with the recess.

In certain exemplary implementations, the electronic circuitry may be disposed in one or more of a sealed middle or front portion of the gauge pressure transducer assembly and may be in communication with a signal port attached to at least a portion of the gauge pressure transducer assembly.

In some implementations, the header and the gauge adapter may be disposed at a backside of the gauge pressure transducer assembly.

In accordance with certain exemplary implementations of the disclosed technology, the header may be a single header. In certain implementations, a second differential sensing element may be mounted to the header.

As used in the specification and the appended claims, the singular forms "a," "an," and "the" include plural referents unless the context clearly dictates otherwise. Also, in describing the preferred embodiments, the terminology has been utilized for the sake of clarity. It is intended that each term contemplates its broadest meaning as understood by those skilled in the art and includes all technical equivalents which operate in a similar manner to accomplish a similar purpose.

As used herein, the terms "comprising" or "containing" or "including" mean that at least the named element or method step is present in the composition or article or method, but does not exclude the presence of other compounds, materials, particles, method steps, even if the other such compounds, material, particles, method steps have the same function as what is named.

Numerous characteristics and advantages have been set forth in the foregoing description, together with details of structure and function. While the disclosed technology has been disclosed in several forms, it will be apparent to those skilled in the art that many modifications, additions, and deletions, especially in matters of shape, size, and arrangement of parts, can be made therein without departing from the spirit and scope of the disclosed technology and its equivalents as set forth in the following claims. Therefore, other modifications or embodiments as may be suggested by the teachings herein are particularly reserved as they fall within the breadth and scope of the claims.

We claim:

1. A gauge pressure transducer assembly, comprising:
    a header having one or more atmospheric ports extending therethrough;
    a first differential sensing element mounted to the header;
    a gauge adapter attached to the header and in communication with the one or more atmospheric ports of the header, the gauge adapter comprising a plurality of through-holes to facilitate drainage and de-icing;
    a front attachment port having a bore extending therethrough; and
    an elongated tube having a front end and a back end, wherein the front end of the elongated tube is disposed in the bore of the front attachment port and the back end of the elongated tube is in communication with at least the first differential sensing element.

2. The gauge pressure transducer assembly of claim 1, wherein the atmospheric ports extend through the header from a first side of the header to a second side of the header, and wherein the first differential sensing element is mounted to the first side of the header.

3. The gauge pressure transducer assembly of claim 2, wherein the first side of the header corresponds to a front portion of the header.

4. The gauge pressure transducer assembly of claim 2, wherein the first side of the header corresponds to a side portion of the header.

5. The gauge pressure transducer assembly of claim 1, wherein the atmospheric ports extend through the header from a first side of the header to a second side of the header, and wherein the gauge adapter is attached to the second side of the header.

6. The gauge pressure transducer assembly of claim 5, wherein the second side of the header corresponds to a back portion of the header.

7. The gauge pressure transducer assembly of claim 5, wherein the second side of the header corresponds to a side portion of the header.

8. The gauge pressure transducer assembly of claim 1, further comprising a header cap having a front side and a back side, wherein the front side of the header cap is attached to the back end of the elongated tube and the back side of the header cap is attached to at least a portion of the header, wherein the header cap is configured to communicate a pressure at the front end of the elongated tube to at least the first differential sensing element.

9. The gauge pressure transducer assembly of claim 8, wherein the header cap comprises a recess configured to accept the back end of the elongated tube, and wherein the header cap comprises a through-hole in axial alignment with the recess.

10. The gauge pressure transducer assembly of claim 1, further comprising electronic circuitry disposed in one or more of a sealed middle or front portion of the gauge pressure transducer assembly, wherein the electronic circuitry is in communication with a signal port attached to at least a portion of the gauge pressure transducer assembly.

11. The gauge pressure transducer assembly of claim 1, wherein the header and the gauge adapter are disposed at a backside of the gauge pressure transducer assembly.

12. The gauge pressure transducer assembly of claim 1, wherein the header is a single header.

13. The gauge pressure transducer assembly of claim 12, further comprising:
    a second differential sensing element mounted to the header; and
    a header cap having a front side and a back side, wherein the front side of the header cap is attached to the back end of the elongated tube and the back side of the header cap is attached to at least a portion of the header, wherein the header cap is configured to communicate a pressure at the front end of the elongated tube to one or more of the first differential sensing element and the second differential sensing element.

14. A method for assembling a gauge pressure transducer, the method comprising:
   preparing a header subassembly, comprising:
      mounting a pressure sensor chip to a header;
      attaching a gauge adapter to the header, the gauge adapter comprising a plurality of through-holes to facilitate drainage and de-icing;
      attaching an elongated tube to a header cap; and
      attaching the header cap to the header;
   preparing a front port assembly, comprising
      attaching electronic circuitry to a front attachment port;
      attaching a sleeve to a portion of the front attachment port; and
      electrically connecting at least one conductor of the electronic circuitry to an electronic signal connector port; and
   attaching the header subassembly to the front port assembly.

15. The method of claim 14, wherein attaching the header subassembly to the front port assembly comprises sliding the elongated tube of the header subassembly into a through-hole of the front attachment port.

16. The method of claim 15, further comprising welding at least a portion of a front end of the elongated tube to the front attachment port.

17. The method of claim 14, further comprising one or more of:
   welding the gauge adapter to the sleeve;
   welding a back end of the elongated tube to the header cap;
   welding the header cap to at least a portion of the header; or
   welding the electronic signal connector port to a portion of the sleeve.

18. The method of claim 14, further comprising sealing the electronic circuitry within a cavity defined at least in part by the front port assembly and the header subassembly.

19. The method of claim 14, further comprising disposing the header and the gauge adapter at a back side portion of the gauge pressure transducer.

20. The method of claim 14, wherein preparing the header subassembly comprises mounting the pressure sensor chip to a side portion of header.

* * * * *